US012559025B2

(12) United States Patent
Kim

(10) Patent No.:    US 12,559,025 B2

(45) Date of Patent:    Feb. 24, 2026

(54) LAMP FOR VEHICLE

(71) Applicant: HYUNDAI MOBIS CO., LTD., Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/909,319

(22) Filed: Oct. 8, 2024

(65) Prior Publication Data

US 2025/0360872 A1    Nov. 27, 2025

(30) Foreign Application Priority Data

May 24, 2024    (KR) ........................ 10-2024-0067962

(51) Int. Cl.
| | |
|---|---|
| B60Q 5/00 | (2006.01) |
| B60Q 1/00 | (2006.01) |
| B60Q 1/26 | (2006.01) |
| F21S 45/47 | (2018.01) |

(52) U.S. Cl.
CPC ............. B60Q 5/00 (2013.01); B60Q 1/0017 (2013.01); B60Q 1/2626 (2013.01); F21S 45/47 (2018.01)

(58) Field of Classification Search
CPC ...... B60Q 5/00; B60Q 1/0017; B60Q 1/2626; B60Q 5/008; B60Q 1/0047; F21S 45/47; F21S 45/00; B06B 1/045; G01H 1/00; H02K 33/12; H02K 16/00; G10K 9/13; G10K 15/02; G10K 9/20; H04R 9/025; H04R 2460/13; H04R 2499/13; H04R 1/1075; H04R 25/606; H04R 25/604; H04R 9/027; B60R 2011/004; B60R 19/48; F21V 33/00; F21W 2103/00; F21W 2107/10
See application file for complete search history.

(56) References Cited

U.S. PATENT DOCUMENTS

| | | | | |
|---|---|---|---|---|
| 2009/0304209 A1* | 12/2009 | Nakatani | .............. | H04R 1/1075 |
| | | | | 381/151 |
| 2014/0121864 A1* | 5/2014 | Nakatani | .................. | G10K 9/13 |
| | | | | 701/22 |
| 2014/0146557 A1* | 5/2014 | Dums | .................... | F21S 41/285 |
| | | | | 362/520 |

FOREIGN PATENT DOCUMENTS

| | | | |
|---|---|---|---|
| CN | 105142087 A | * | 12/2015 |
| CN | 216491036 U | * | 5/2022 |

OTHER PUBLICATIONS

Search English translation of CN 105142087 A (Year: 2015).*
Search English translation of CN 216491036 U (Year: 2022).*

* cited by examiner

*Primary Examiner* — Omar Rojas Cadima
(74) *Attorney, Agent, or Firm* — NSIP Law

(57)    ABSTRACT

A lamp for a vehicle including a lamp housing part configured to accommodate a light source in an internal lamp housing part space, an outer lens part coupled to the lamp housing part and to cover the internal lamp housing part space, and a vibration part fixed to the lamp housing part, the vibration part including a first module fixed to the first side of the lamp housing part and a second module configured to face the first module, the first module including a first magnet and a first magnet fixing portion, the second module including a second magnet configured to face the first magnet, a second magnet fixing portion configured to accommodate the second magnet, and a coil member provided at one side of the second magnet and accommodated in the second magnet fixing portion, and the first magnet fixing portion being fixed to the lamp housing part.

20 Claims, 19 Drawing Sheets

10

100

400

424

424-1

422a

422

10

100

400

LAMP FOR VEHICLE

CROSS-REFERENCE TO RELATED APPLICATION

This application claims the benefit under 35 USC § 119(a) of Korean Patent Application No. 10-2024-0067962 filed in the Korean Intellectual Property Office on May 24, 2024, the entire disclosure of which is incorporated herein by reference for all purposes.

TECHNICAL FIELD

The present disclosure relates to a lamp for a vehicle.

BACKGROUND ART

Recently, with the increasing demand for entertainment functions in addition to transportation functions required for vehicles, there has been a growing need for lamps mounted in the vehicles to have additional functions in addition to simple lighting functions. For example, recently, a lamp for a vehicle has additionally adopted a function capable of performing communication with the outside.

In the related art, the lamp for a vehicle performs the function of communication with the outside by means of visual information such as lighting images or light distribution patterns of the lamp for a vehicle. Meanwhile, the methods of performing the function of communication with the outside also include a method using auditory information, such as sounds, in addition to the method using visual information. However, because the lamp for a vehicle in the related art adopts a watertight structure to prevent moisture from accumulating in the lamp for a vehicle, it is difficult to mount a speaker, which is configured to output a sound, in the lamp for a vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a lamp for a vehicle including a lamp housing part configured to accommodate a light source in an internal lamp housing part space defined therein, an outer lens part coupled to a first side of the lamp housing part and configured to cover the internal lamp housing part space, and a vibration part fixed to the lamp housing part, the vibration part including a first module fixed to the first side of the lamp housing part and a second module configured to face the first module, the first module including a first magnet and a first magnet fixing portion to which the first magnet is fixed, the second module including a second magnet configured to face the first magnet, a second magnet fixing portion configured to accommodate the second magnet, and a coil member provided at one side of the second magnet and accommodated in the second magnet fixing portion, and the first magnet fixing portion being fixed to the lamp housing part.

A through-hole may be formed in the second magnet and a rib region may be provided on the second magnet fixing portion, the rib region being configured to protrude so as to be inserted into the through-hole of the second magnet.

The first magnet fixing portion may include a first module sidewall region configured to protrude from the lamp housing part and configured to define a first magnet accommodation space therein configured to accommodate the first magnet, the second magnet fixing portion may include a second module sidewall region configured to extend toward the first magnet fixing portion, a first screw thread region may be formed in the first module sidewall region, a second screw thread region may be formed in the second module sidewall region, and the first screw thread region and the second screw thread region may be screw-coupled to each other.

The first magnet fixing portion may include a first protruding coupling region configured to protrude outward from an outer peripheral surface of the first module sidewall region, the second magnet fixing portion may include a second protruding coupling region configured to protrude toward the first magnet fixing portion from the second module sidewall region, and the first protruding coupling region may be fixedly coupled to the second protruding coupling region.

A recessed section having a recessed shape may be formed in the second protruding coupling region, and at least a part of the first protruding coupling region is inserted into the recessed section.

The first screw thread region may be provided as a plurality of first screw thread regions provided along a periphery of the first module sidewall region, the plurality of first screw thread regions being spaced apart from one another, the second screw thread region may be provided as a plurality of second screw thread regions provided along a periphery of the second module sidewall region, the plurality of second screw thread regions being spaced apart from one another, and the plurality of first screw thread regions and the plurality of second screw thread regions may be respectively screw-coupled to one another.

A smooth curved surface region may be formed in a first section of the first module sidewall region between a first respective pair of adjacent first screw thread regions and a smooth curved surface region may be formed in a second section of the second module sidewall region between a second respective pair of adjacent second screw thread regions.

The second module may include a connection member, the connection member being electrically connected to the coil member, an insertion hole is formed in the second magnet fixing portion, and a part of the connection member may be configured to pass through the insertion hole.

The insertion hole may be formed in a first region of the second magnet fixing portion spaced apart from the first module in a first direction in which the first magnet faces the second magnet.

The second magnet fixing portion may include a first frame region configured to accommodate the second magnet and the coil member, the first frame region being configured to be opened toward the first module and a second frame region configured to surround the first frame region and configured to fix the first frame region to the second frame region, and a third section of the second frame region to which the first frame region is fixed may have a shape configured to protrude toward the first module further than a peripheral section of the third section to which the first frame region is fixed.

The second module sidewall region may be provided in the second frame region and the first frame region may be configured to protrude toward the first module further than the second module sidewall region.

The lamp may include a heat sink provided at one side of the lamp housing part, and a first side of the second module may be supported by the heat sink.

In a general aspect, here is provided a lamp for a vehicle including a lamp housing part configured to accommodate a light source in an internal lamp housing part space defined therein, an outer lens part coupled to a first side of the lamp housing part and configured to cover the internal lamp housing part space, and a vibration part fixed to the outer lens part, the vibration part including a first module fixed to the first side of the lamp housing part, and a second module configured to face the first module, the first module including a first magnet, and a first magnet fixing portion to which the first magnet is fixed, the second module including a second magnet configured to face the first magnet, a second magnet fixing portion configured to accommodate the second magnet, and a coil member provided at one side of the second magnet and accommodated in the second magnet fixing portion, and the first magnet fixing portion is fixed to the outer lens part.

The lamp may include a heat sink provided at one side of the lamp housing part, and a first side of the second module may be supported by the heat sink.

One side of the first module may be fixed to one of an upper and a lower region of an inner surface of the outer lens part that extends in a direction intersecting an upward/downward direction, and one side of the second module may be fixed to an end of a region of the heat sink that protrudes upward or downward.

A first side of the first module may be fixed to a first region of an inner surface of the outer lens part that extends in a direction intersecting a horizontal direction, and a first side of the second module may be fixed to an end of a region of the heat sink that protrudes in the horizontal direction.

The first magnet fixing portion may include a first module sidewall region configured to protrude from the outer lens part and configured to define a first magnet accommodation space therein configured to accommodate the first magnet, the second magnet fixing portion may include a second module sidewall region configured to extend toward the first magnet fixing portion, a first screw thread region may be formed in the first module sidewall region, a second screw thread region may be formed in the second module sidewall region, and the first screw thread region and the second screw thread region may be screw-coupled to each other.

The first magnet fixing portion may include a first protruding coupling region configured to protrude outward from an outer peripheral surface of the first module sidewall region, the second magnet fixing portion may include a second protruding coupling region configured to protrude toward the first magnet fixing portion from the second module sidewall region, and the first protruding coupling region may be fixedly coupled to the second protruding coupling region.

The first screw thread region may be provided as a plurality of first screw thread regions provided along a periphery of the first module sidewall region, the plurality of first screw thread regions being spaced apart from one another, the second screw thread region may be provided as a plurality of second screw thread regions provided along a periphery of the second module sidewall region, the plurality of second screw thread regions being spaced apart from one another, and the plurality of first screw thread regions and the plurality of second screw thread regions may be respectively screw-coupled to one another.

Figure 1:
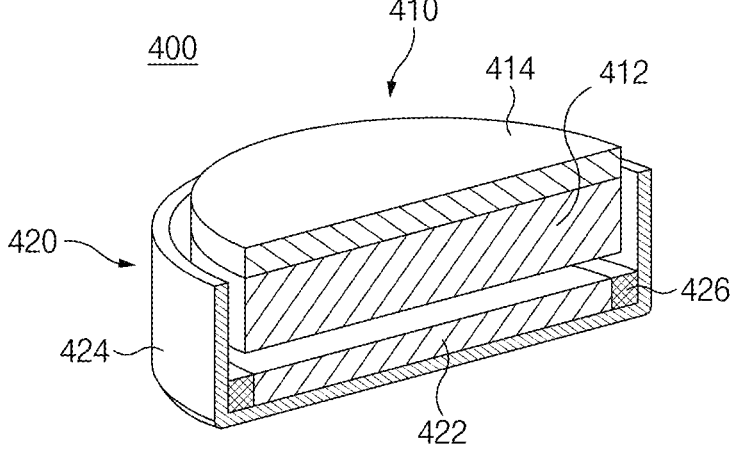
FIG. 1 is a view schematically illustrating a cross-sectional structure of a vibration part provided in a lamp for a vehicle according to the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a lamp for a vehicle according to the present disclosure will be described with reference to the drawings.

Lamp for Vehicle

Figure 2:
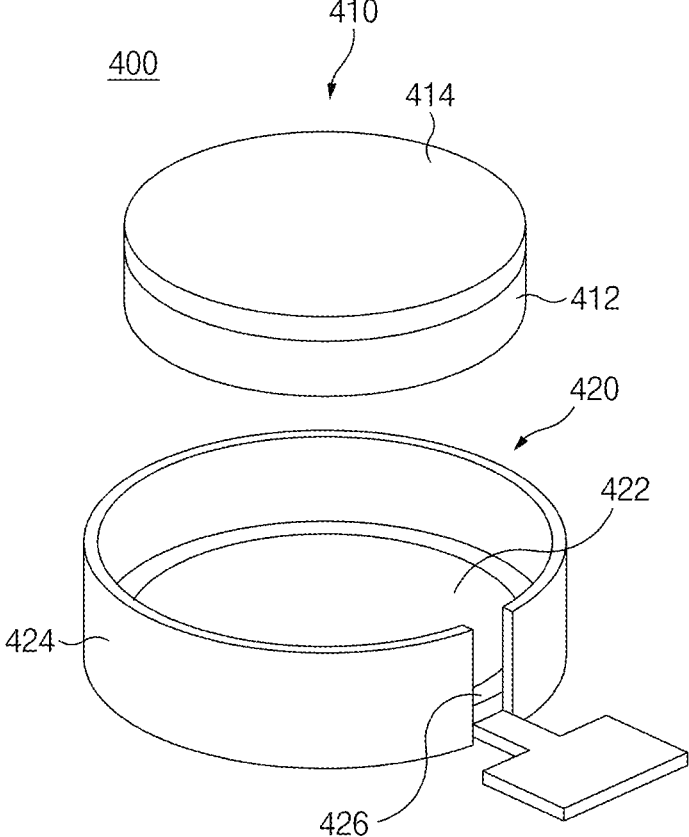
FIG. 2 is a view illustrating a state in which a first module and a second module of the vibration part illustrated in FIG. 1 are spaced apart from each other.
Figure 3:
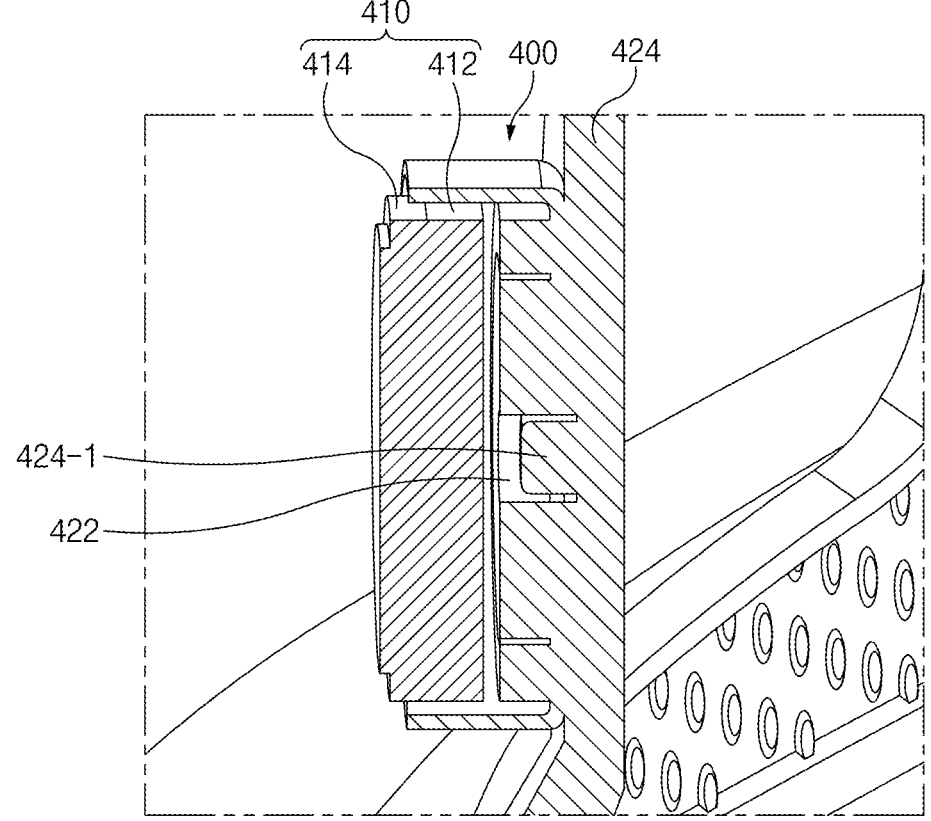
FIG. 3 is a detailed view illustrating a cross-sectional structure of the vibration part provided in the lamp for a vehicle according to the embodiment of the present disclosure.
Figure 4:
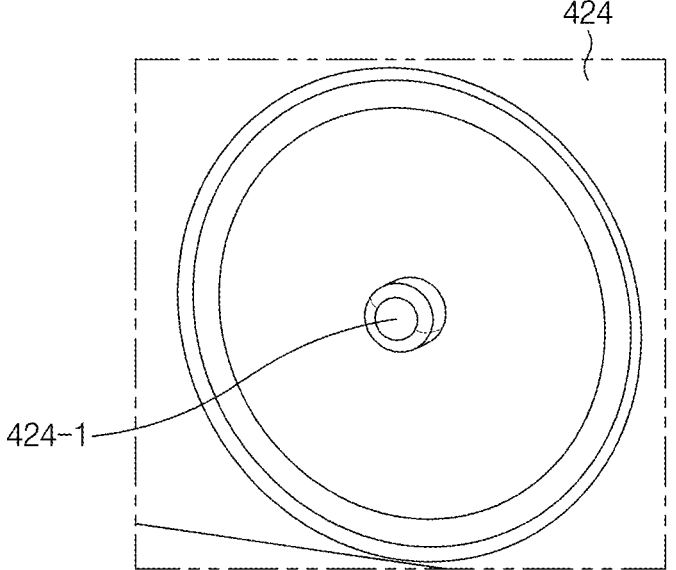
FIG. 4 is an enlarged view illustrating a rib region formed on a second magnet fixing portion of the second module provided in the vibration part in FIG. 3.
Figure 5:
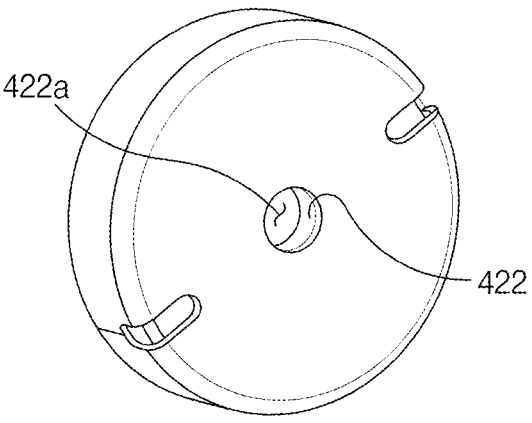
FIG. 5 is a view illustrating a state in which a through-hole corresponding to the rib region formed on the second magnet fixing portion is formed in a second magnet.
Figure 6:
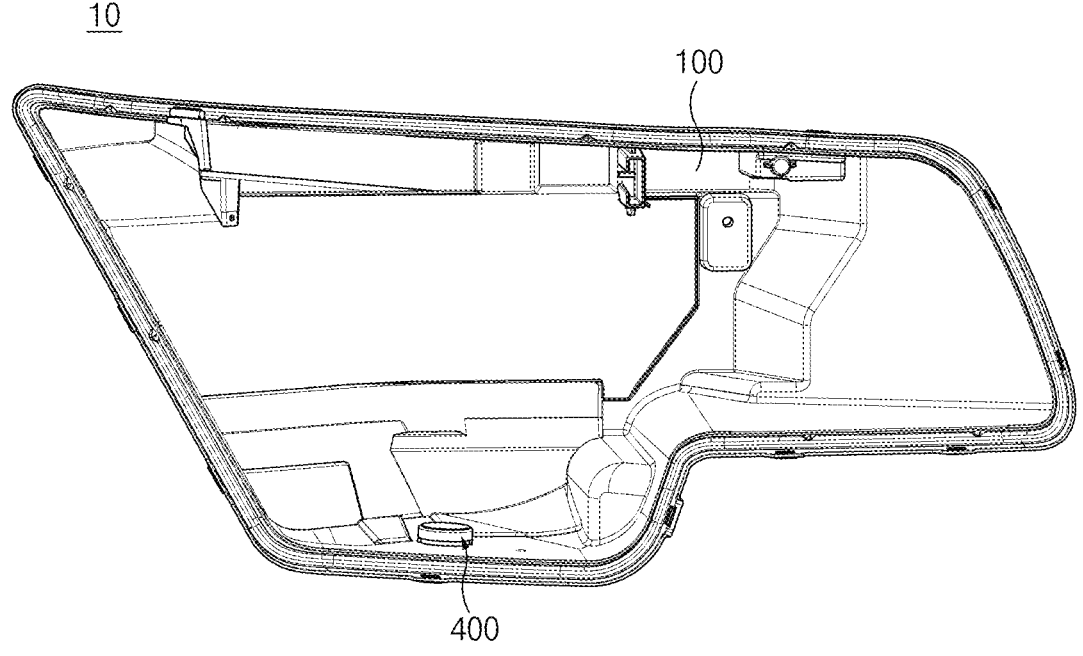
FIG. 6 is a view illustrating a state in which the vibration part is fixed to a lamp housing part in the lamp for a vehicle according to the embodiment of the present disclosure.
Figure 7:
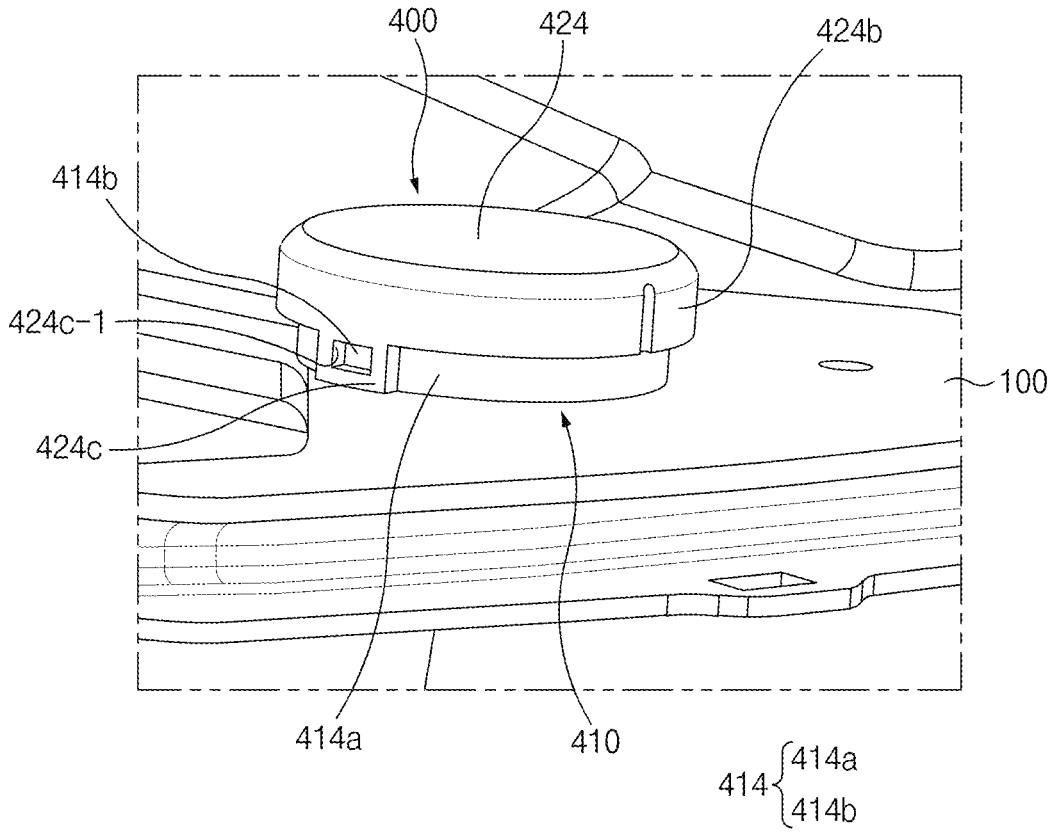
FIG. 7 is an enlarged view of the vibration part in FIG. 6.
Figure 8:
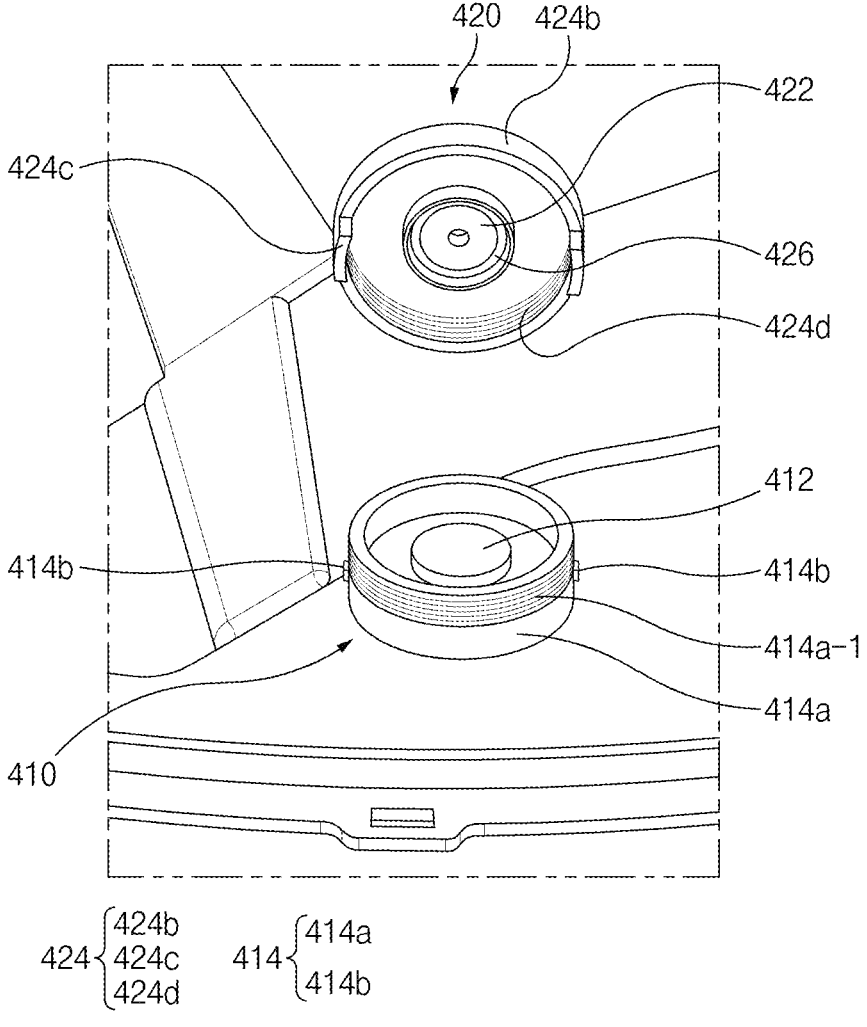
FIG. 8 is a view illustrating a state in which the first module and the second module of the vibration part illustrated in FIG. 6 are separated.
Figure 9:
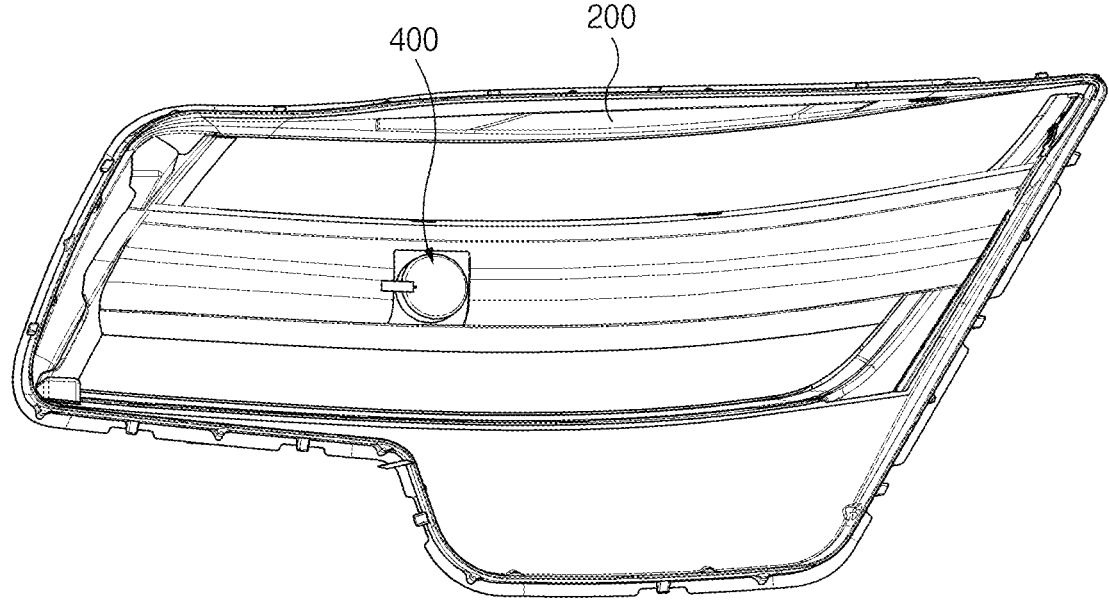
FIG. 9 is a view illustrating a state in which the vibration part is fixed to an outer lens part in the lamp for a vehicle according to the embodiment of the present disclosure.
Figure 10:
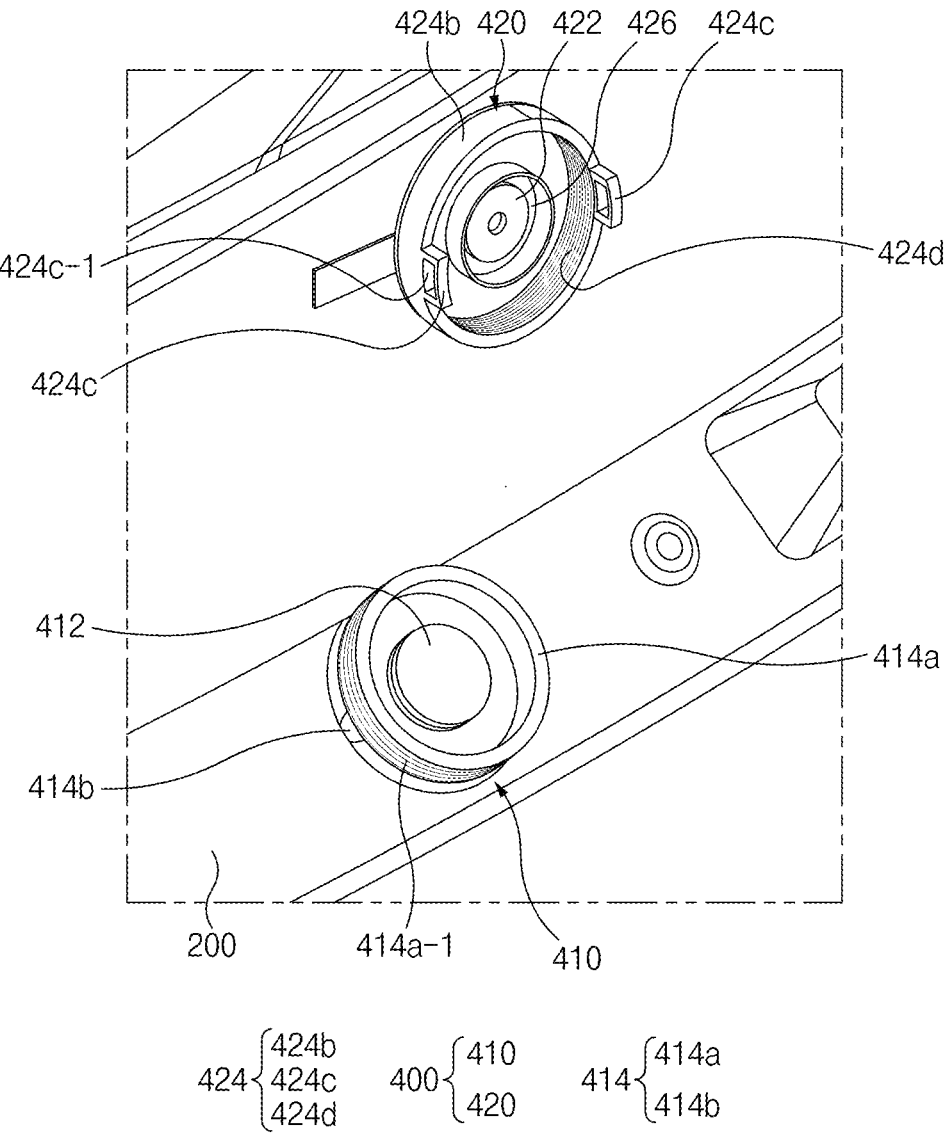
FIG. 10 is a view illustrating a state in which the first module and the second module of the vibration part in FIG. 9 are separated.

FIG. 1 is a view schematically illustrating a cross-sectional structure of a vibration part provided in a lamp for a vehicle according to the present disclosure, and FIG. 2 is a view illustrating a state in which a first module and a second module of the vibration part illustrated in FIG. 1 are spaced apart from each other. FIG. 3 is a detailed view illustrating a cross-sectional structure of the vibration part provided in the lamp for a vehicle according to the embodiment of the present disclosure, and FIG. 4 is an enlarged view illustrating a rib region formed on a second magnet fixing portion of the second module provided in the vibration part in FIG. 3. FIG. 5 is a view illustrating a state in which a through-hole corresponding to the rib region formed on the second magnet fixing portion is formed in a second magnet, and FIG. 6 is a view illustrating a state in which the vibration part is fixed to a lamp housing part in the lamp for a vehicle according to the embodiment of the present disclosure. FIG. 7 is an enlarged view of the vibration part in FIG. 6, and FIG. 8 is a view illustrating a state in which the first module and the second module of the vibration part illustrated in FIG. 6 are separated. FIG. 9 is a view illustrating a state in which the vibration part is fixed to an outer lens part in the lamp for a vehicle according to the embodiment of the present disclosure, and FIG. 10 is a view illustrating a state in which the first module and the second module of the vibration part in FIG. 9 are separated.

With reference to FIGS. 1 to 10, a lamp 10 for a vehicle (hereinafter, referred to as a 'lamp') according to the present disclosure may include a lamp housing part 100 having an internal space configured to accommodate a light source, and an outer lens part 200 coupled to one side of the lamp housing part 100 and configured to cover the internal space. More specifically, the outer lens part 200 may be fixedly coupled to the lamp housing part 100. The light emitted from the light source may propagate to the outside through the outer lens part 200, such that predetermined light distribution patterns and lighting images may be formed.

Meanwhile, according to the present disclosure, the lamp 10 may not only form predetermined light distribution patterns and lighting images, like the lamp in the related art, but also generate a sound. More specifically, the lamp 10 according to the present disclosure may output a sound by vibrating the lamp housing part 100 or the outer lens part 200.

In order to achieve the above-mentioned object, the lamp 10 according to the present disclosure may include a vibration part 400 fixed to the lamp housing part 100 or the outer lens part 200. The vibration part 400 may be configured to output a sound by vibrating the lamp housing part 100 or the outer lens part 200. FIGS. 6 to 8 illustrate states in which the vibration part 400 is fixed to the lamp housing part 100, and FIGS. 9 and 10 illustrate states in which the vibration part 400 is fixed to the outer lens part 200. The vibration part 400 may be accommodated in the internal space formed in the lamp housing part 100.

Meanwhile, with reference to FIGS. 1 to 5, the vibration part 400 may have a structure in which a plurality of modules are coupled. More specifically, the vibration part 400 may include a first module 410, and a second module 420 provided to face the first module 410. With reference to FIGS. 3 to 8, the first module 410 may be fixed to one side of the lamp housing part 100 or the outer lens part 200, and the second module 420 may be coupled to the first module 410. That is, according to the present disclosure, as described below, the second module 420 may be relatively fixed to the lamp housing part 100 or the outer lens part 200 by means of the first module 410.

With reference back to FIGS. 1 to 5, the first module 410 may include a first magnet 412. The first magnet 412 may be a permanent magnet. In addition, the second module 420 may include a second magnet 422 provided to face the first magnet 412. The second magnet 422 may be a permanent magnet. More particularly, the first magnet 412 and the second magnet 422 may be disposed to apply a repulsive force therebetween. Meanwhile, the second module 420 may further include a second magnet fixing portion 424 configured to accommodate the second magnet 422, and a coil member 426 provided at one side of the second magnet 422 and accommodated in the second magnet fixing portion 424. For example, as illustrated in FIGS. 1 to 5, the coil member 426 may be provided to surround an outer periphery of the second magnet 422. According to the present disclosure, at ordinary times, a constant interval between the first module 410 and the second module 420 is maintained by the repulsive force between the first magnet 412 and the second magnet 422. In case that an electric current is supplied to the coil member 426, a force applied between the first module 410 and the second module 420 is changed over time by an electromagnetic force, such that the first module 410 vibrates. Therefore, as the lamp housing part 100 or the outer lens part 200, to which the first module 410 is fixed, vibrates, a sound may be outputted from the lamp 10.

Meanwhile, as illustrated in FIGS. 1 to 5, the first module 410 may further include a first magnet fixing portion 414 to which the first magnet 412 is fixed. For example, the first magnet fixing portion 414 may have an approximately circular plate shape. In this case, as illustrated in FIGS. 6 to 10, according to the present disclosure, the first magnet fixing portion 414 may be bonded to the lamp housing part 100 or the outer lens part 200. For example, the first magnet fixing portion 414 may be fixedly coupled to the lamp housing part 100 or the outer lens part 200 by means of a bonding agent or an adhesive tape. Hereinafter, a structure in which the second module 420 of the vibration part 400 is fixed to the lamp housing part 100 or the outer lens part 200 will be described in detail.

With reference to FIGS. 3 to 5, a through-hole 422a may be formed in the second magnet 422 of the second module 420. A rib region 424a may be provided on the second magnet fixing portion 424 of the second module 420 and protrude so as to be inserted into the through-hole 422a formed in the second magnet 422. The through-hole 422a and the rib region 424a may be configured to dispose the second magnet 422 at an exact position by aligning relative positions between the second magnet 422 and the second magnet fixing portion 424. More particularly, a size of the rib region 424a may correspond to a size of the through-hole 422a.

With reference to FIGS. 6 to 10, the first magnet fixing portion 414 of the first module 410 may include a first module sidewall region 414a protruding from the lamp housing part 100 or the outer lens part 200 and configured to define a space configured to accommodate the first magnet 412. FIGS. 6 to 8 illustrate states in which the first module sidewall region 414a protrudes from the lamp housing part 100. FIGS. 9 and 10 illustrate states in which the first module sidewall region 414a protrudes from the outer lens part 200.

Meanwhile, the second magnet fixing portion 424 may have a configuration corresponding to the first module sidewall region 414a. More specifically, the second magnet fixing portion 424 may include a second module sidewall region 424b extending toward the first magnet fixing portion 414.

In this case, according to the present disclosure, a first screw thread region 414a-1 may be formed in the first module sidewall region 414a, a second screw thread region 424d may be formed in the second module sidewall region 424b, and the first screw thread region 414a-1 and the second screw thread region 424d may be screw-coupled to each other. That is, according to the present disclosure, the first module 410 and the second module 420 may be fixedly coupled by being screw-coupled to each other. FIGS. 6 to 8 illustrate states in which the first module 410 and the second module 420 are screw-coupled to each other, such that the vibration part 400 is fixedly coupled to the lamp housing part 100. FIGS. 9 and 10 illustrate states in which the first module 410 and the second module 420 are screw-coupled to each other, such that the vibration part 400 is fixedly coupled to the outer lens part 200. In addition, for example, FIGS. 6 to 10 illustrate states in which the first screw thread region 414a-1 is formed on an outer peripheral surface of the first module sidewall region 414a, and the second screw thread region 424d is formed on an inner peripheral surface of the second module sidewall region 424b.

With continued reference to FIGS. 6 to 10, the first magnet fixing portion 414 may further include first protruding coupling regions 414b protruding outward from the outer peripheral surface of the first module sidewall region 414a, and the second magnet fixing portion 424 may further include second protruding coupling regions 424c protruding toward the first magnet fixing portion 414 from the second module sidewall region 424b. In this case, the first protruding coupling region 414b may be fixedly coupled to the second protruding coupling region 424c. For example, as illustrated in FIGS. 6 to 10, a recessed section 424c-1 having a recessed shape may be formed in the second protruding coupling region 424c, and at least a part of the first protruding coupling region 414b may be inserted into the recessed section 424c-1. In case that the first protruding coupling region 414b and the second protruding coupling region 424c are fixedly coupled to each other as described above, the first module 410 and the second module 420 may be rotated relative to each other after the first module 410 and the second module 420 are screw-coupled to each other, thereby effectively preventing the screw coupling from being loosened. For example, FIGS. 6 to 10 illustrate states in which the recessed section 424c-1 has a hole shape. It may be understood that a partial region of the second protruding coupling region 424c has an opened shape, and a part of the first protruding coupling region 414b is fitted into the opened region.

Figure 11:
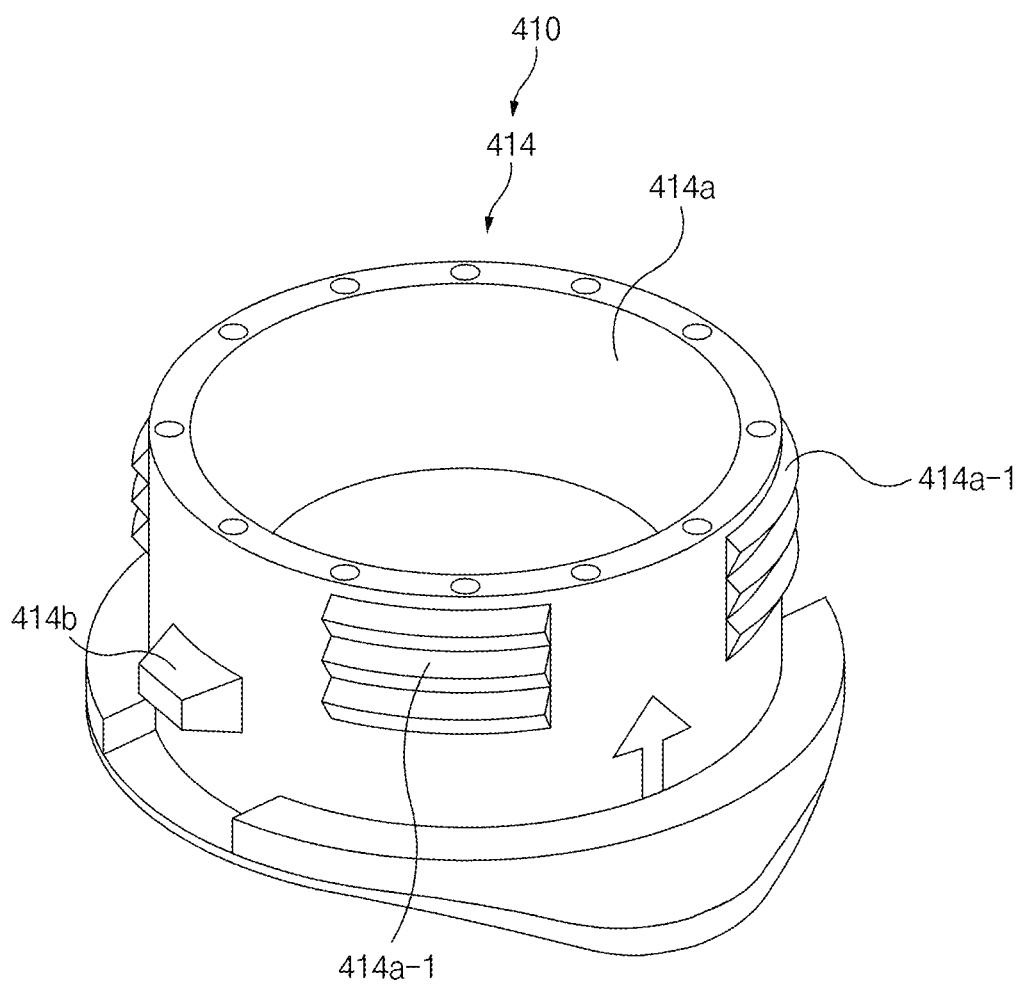
FIG. 11 is a view for explaining another example of the vibration part provided in the lamp for a vehicle according to the present disclosure and illustrates a first magnet fixing portion of the first module.
Figure 12:
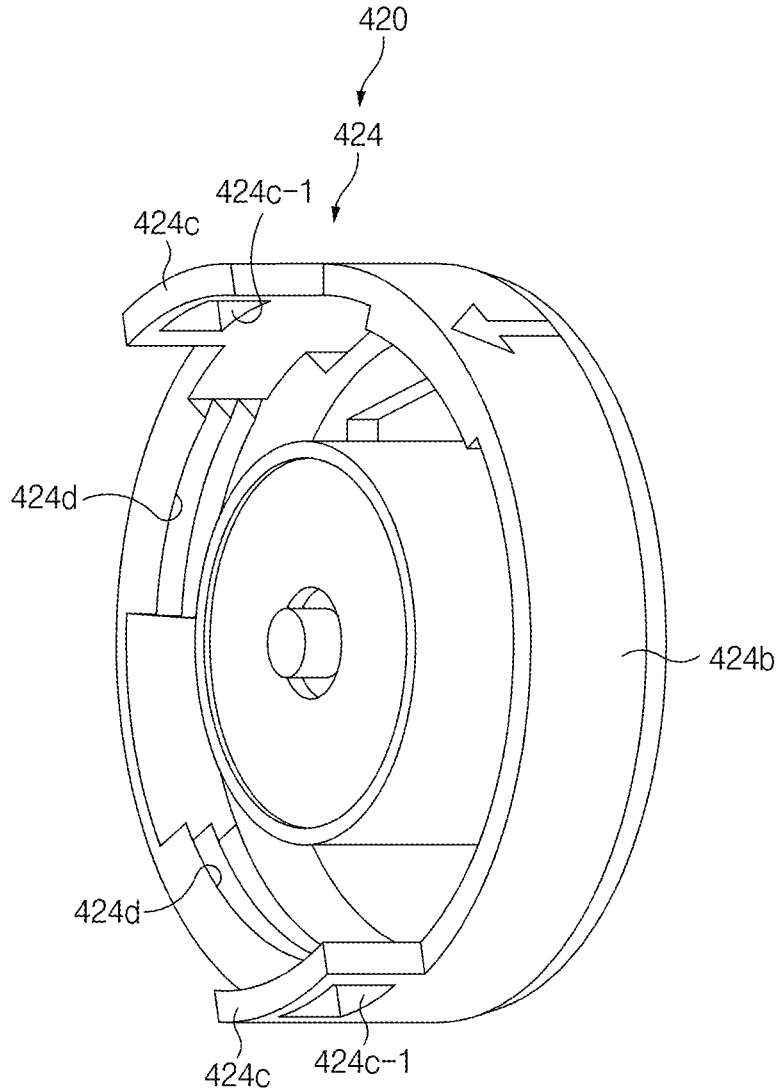
FIG. 12 is a view for explaining another example of the vibration part provided in the lamp for a vehicle according to the present disclosure and illustrates a second magnet fixing portion of the second module and the first module.

FIG. 11 is a view for explaining another example of the vibration part provided in the lamp for a vehicle according to the present disclosure and illustrates the first magnet fixing portion of the first module, and FIG. 12 is a view for explaining another example of the vibration part provided in the lamp for a vehicle according to the present disclosure and illustrates the second magnet fixing portion of the second module and the first module.

With reference to FIG. 11 and 12, the first screw thread region 414a-1 and the second screw thread region 424d may be discontinuously formed on inner peripheral surfaces or outer peripheral surfaces of the first module sidewall region 414a and the second module sidewall region 424b. More specifically, as illustrated in FIG. 11, the plurality of first screw thread regions 414a-1 may be provided along the peripheral surface (e.g., the outer peripheral surface) of the first module sidewall region 414a and spaced apart from one another, and the plurality of second screw thread regions 424d may be provided along the peripheral surface (e.g., the inner peripheral surface) of the second module sidewall region 424b and spaced apart from one another. In this case, the plurality of first screw thread regions 414a-1 and the plurality of second screw thread regions 424d may be screw-coupled to one another in a one-to-one manner. In case that the plurality of first screw thread regions 414a-1 and the plurality of second screw thread regions 424d are provided along the peripheral surfaces and spaced apart from one another as described above, the first protruding coupling region 414b may be provided in a region between the two first screw thread regions 414a-1 spaced apart from each other, and the second protruding coupling region 424c may be provided in a region between the two second screw thread regions 424d spaced apart from each other. More particularly, during the process in which the screw coupling is performed, the screw coupling may be completed before the first screw thread region 414a-1 faces another second screw thread region 424d after the first screw thread region 414a-1 passes over one second screw thread region 424d. In this case, it is possible to minimize a degree to which the first protruding coupling region 414b and the second protruding coupling region 424c interfere with each other during the screw coupling process.

Meanwhile, with continued reference to FIGS. 11 and 12, a smooth curved surface region may be formed in a section of the first module sidewall region 414a between two adjacent first screw thread regions 414a-1 (i.e., of one or more adjacent pairs of the plurality of first screw thread regions 414a-1), and a smooth curved surface region may be formed in a space of the second module sidewall region 424b between two adjacent second screw thread regions 424d (i.e., of one or more adjacent pairs of the plurality of second screw thread regions 424d). In this case, the first screw thread region 414a-1 and the second screw thread region 424d may be smoothly screw-coupled to each other without interference.

Figure 13:
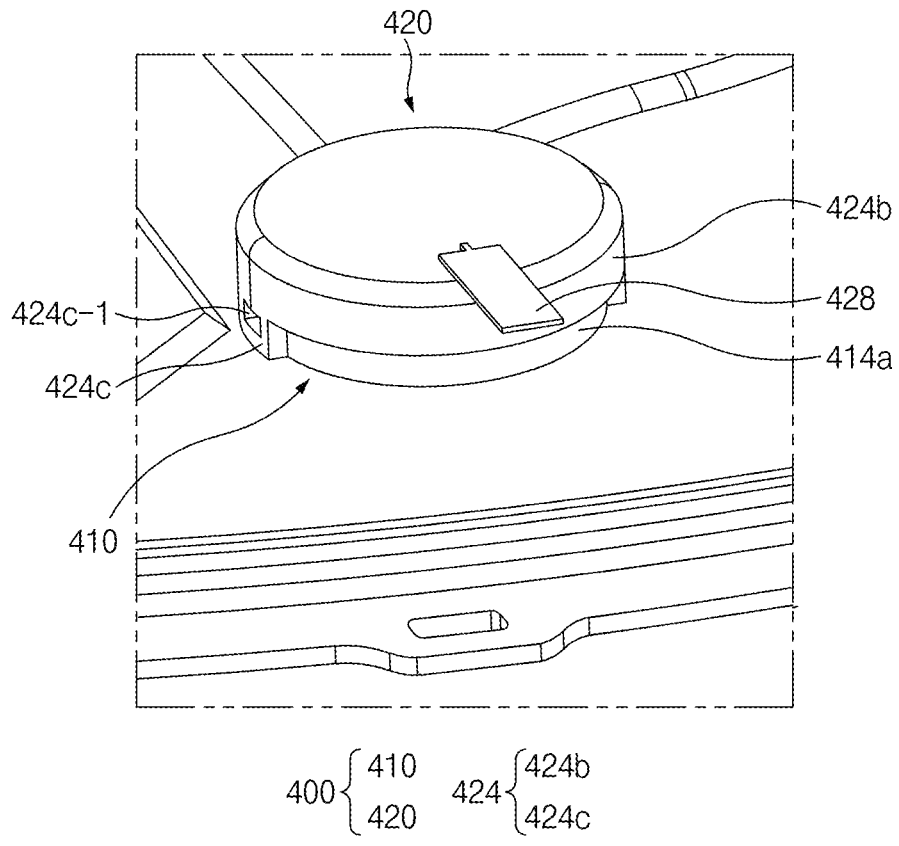
FIG. 13 is a view for explaining a connection member of the vibration part of the lamp for a vehicle according to the present disclosure.
Figure 14:
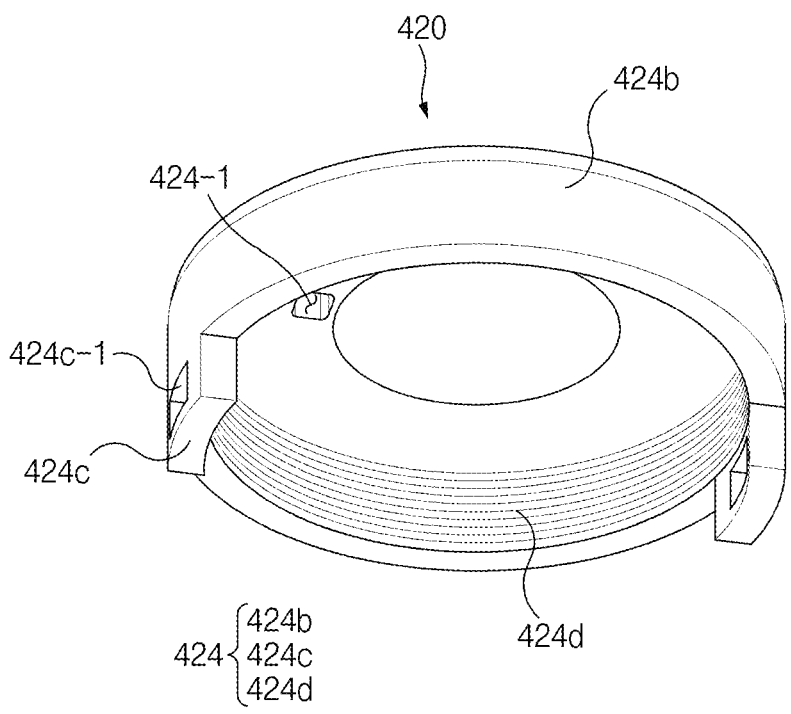
FIG. 14 is a view for explaining the second magnet fixing portion of the vibration part illustrated in FIG. 13.

FIG. 13 is a view for explaining a connection member of the vibration part of the lamp for a vehicle according to the present disclosure, and FIG. 14 is a view for explaining the second magnet fixing portion of the vibration part illustrated in FIG. 13.

Meanwhile, with reference to FIGS. 13 and 14, the second module 420 of the vibration part 400 may further include a connection member 428 electrically connected to the coil member 426. The connection member 428 may be configured to provide an electric current to the coil member 426 or receive an electrical signal from the coil member 426. For example, the connection member 428 may be a PCB or a wire with electrical conductivity.

In this case, according to the present disclosure, an insertion hole 424-1 may be formed in the second magnet fixing portion 424. More specifically, the connection member 428 may be configured to pass through the insertion hole 424-1. That is, according to the present disclosure, the connection member 428 may be configured to penetrate the second magnet fixing portion 424. In case that the connection member 428 is provided to penetrate the second magnet fixing portion 424 through the insertion hole 424-1 as described above, it is possible to prevent the connection member 428 from interfering with the first magnet fixing portion 414 during the screw coupling process. Therefore, more particularly, the insertion hole 424-1 may be formed in a region of the second magnet fixing portion 424 as distant from the first module 410 as possible. For example, as illustrated in FIGS. 13 and 14, the insertion hole 424-1 may be formed in a region of the second magnet fixing portion 424 spaced apart from the first module 410 in a direction in which the first magnet 412 faces the second magnet 422. That is, in case that the first module 410 and the second module 420 are disposed in an upward/downward direction based on FIGS. 13 and 14, the insertion hole 424-1 may be formed in an upper surface of the second magnet fixing portion 424.

Figure 15:
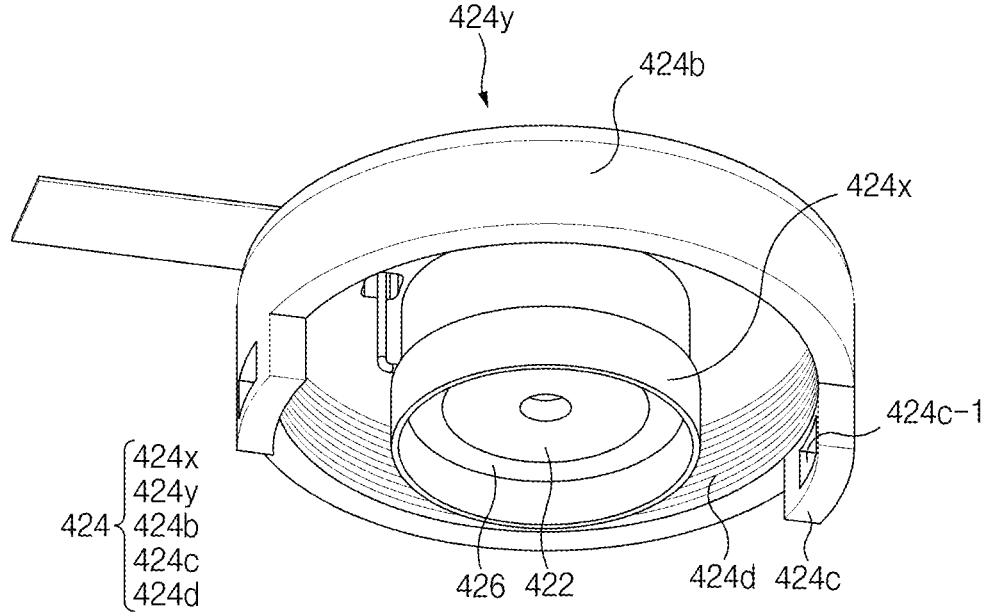
FIG. 15 is a view for explaining another example of the vibration part provided in the lamp for a vehicle according to the present disclosure and illustrates the second module.
Figure 16:
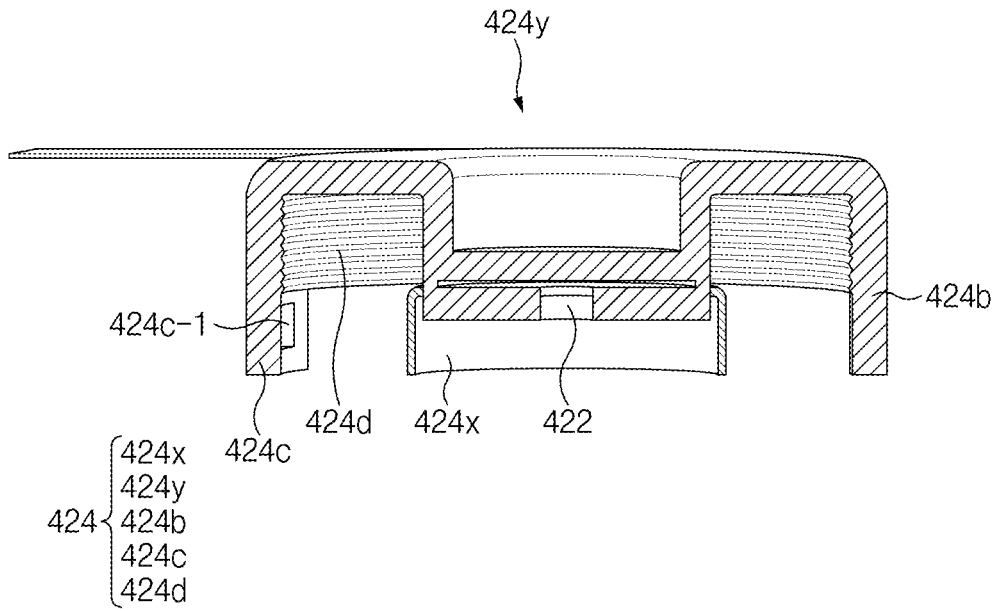
FIG. 16 is a view illustrating a cross-sectional structure of the vibration part illustrated in FIG. 15.

FIG. 15 is a view for explaining another example of the vibration part provided in the lamp for a vehicle according to the present disclosure and illustrates the second module, and FIG. 16 is a view illustrating a cross-sectional structure of the vibration part illustrated in FIG. 15.

With reference to FIGS. 15 and 16, the second magnet fixing portion 424 may be divided into a plurality of regions. More specifically, the second magnet fixing portion 424 may include a first frame region 424x configured to accommodate the second magnet 422 and the coil member 426 and opened toward the first module 410, and a second frame region 424y provided to surround the first frame region 424x and configured such that the first frame region 424x is fixed to second frame region 424y. However, the configuration in which the first frame region 424x is fixed to the second frame region 424y does not mean that the first frame region 424x and the second frame region 424y are configured as separate components. That is, the first frame region 424x and the second frame region 424y may be integrated. However, even though the above-mentioned two components are integrated, the two components may be distinguished by shape features to be described below.

With reference to FIGS. 15 and 16, a section of the second frame region 424y to which the first frame region 424x is fixed may have a shape further protruding toward the first module 410 than a peripheral section of the section to which the first frame region 424x is fixed. The configuration in which the second frame region 424y has the above-mentioned protruding shape is provided to configure a predetermined interval between the first magnet 412 and the second magnet 422 so that a sufficient repulsive force is applied between the first magnet 412 and the second magnet 422.

Meanwhile, for example, the second module sidewall region 424b may be provided in the second frame region 424y, and the first frame region 424x may further protrude toward the first module 410 than the second module sidewall region 424b.

Figure 17:
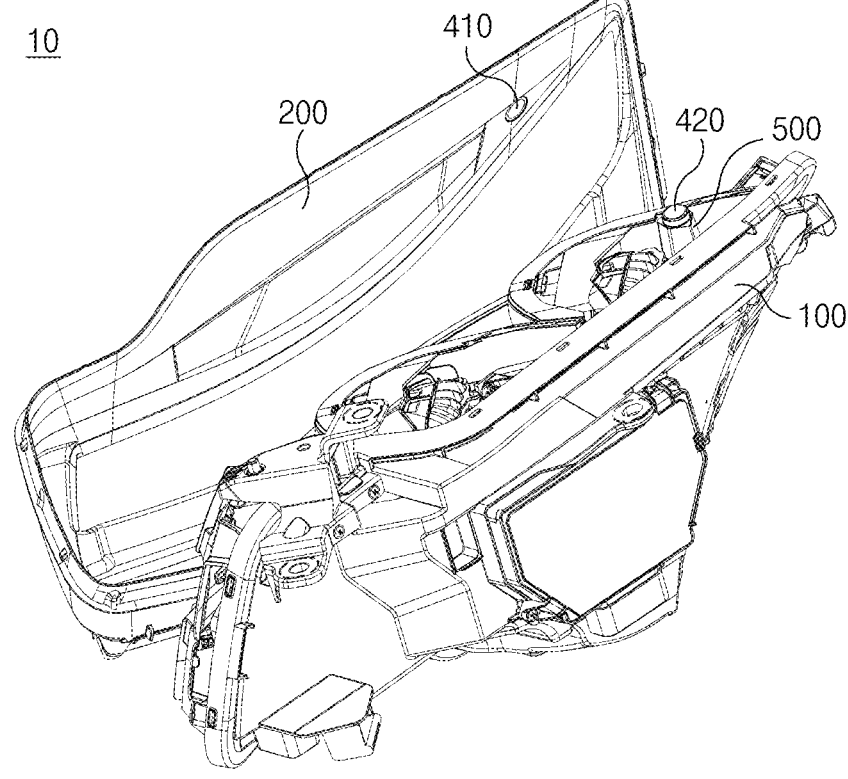
FIG. 17 is a view illustrating an example of a state in which the vibration part provided in the lamp for a vehicle according to the present disclosure is fixed to a heat sink.
Figure 18:
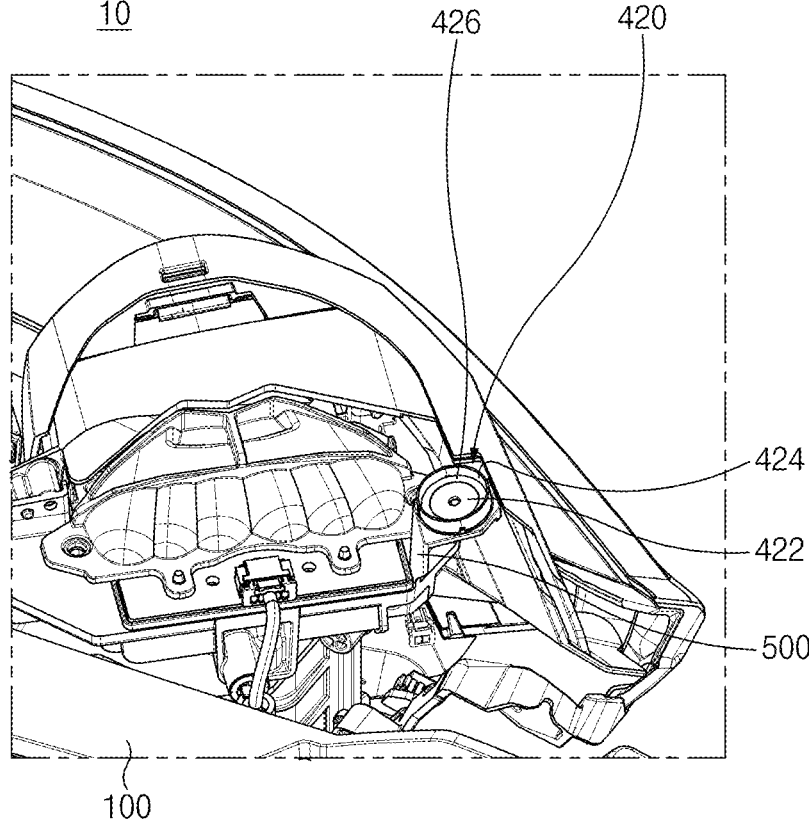
FIG. 18 is an enlarged view illustrating the heat sink and the second module of the vibration part in FIG. 17.
Figure 19:
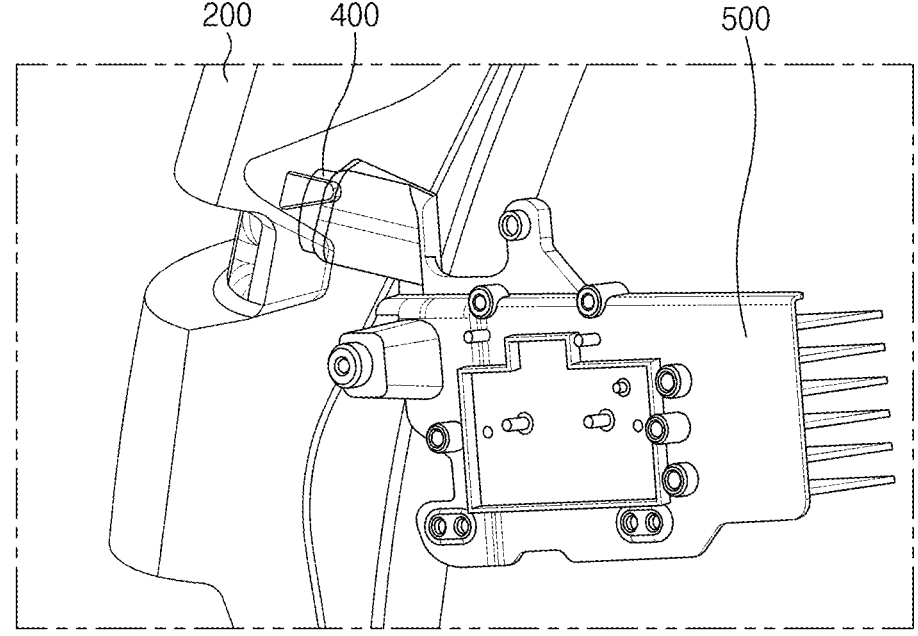
FIG. 19 is a view illustrating an example of a state in which the vibration part provided in the lamp for a vehicle according to the present disclosure is fixed to the heat sink.

FIG. 17 is a view illustrating an example of a state in which the vibration part provided in the lamp for a vehicle according to the present disclosure is fixed to a heat sink, and FIG. 18 is an enlarged view illustrating the heat sink and the second module of the vibration part in FIG. 17. FIG. 19 is a view illustrating an example of a state in which the vibration part provided in the lamp for a vehicle according to the present disclosure is fixed to the heat sink.

With reference to FIGS. 17 to 19, the lamp 10 according to the present disclosure may include a heat sink 500 provided at one side of the lamp housing part 100 or the outer lens part 200. The heat sink 500 may be configured to receive heat generated from heating elements, such as the light source of the lamp 10, and dissipate the heat to the outside. In this case, according to one aspect of the present disclosure, a part of the vibration part 400 may be supported by the heat sink 500. More specifically, one side of the second module 420 of the vibration part may be supported by the heat sink 500. More particularly, the second module 420 may be fixed to the heat sink 500.

For example, as illustrated in FIGS. 17 and 18, one side of the first module 410 provided in the vibration part may be fixed to an upper or lower region of the inner surface of the outer lens part 200 that extends in a direction (e.g., a horizontal direction) intersecting an upward/downward direction. The second module 420 may be fixed to an end of a region of the heat sink 500 that protrudes upward or downward. FIGS. 17 and 18 illustrate states in which the first module 410 is fixed to the upper region of the inner surface of the outer lens part 200, and the second module 420 is fixed to an upper end of the region of the heat sink 500 that protrudes upward.

In contrast, as another example, as illustrated in FIG. 19, one side of the first module 410 provided in the vibration part may be fixed to a region of the inner surface of the outer lens part 200 that extends in the direction (e.g., the upward/downward direction) intersecting the horizontal direction. The second module 420 may be fixed to an end of a region of the heat sink 500 that protrudes in the horizontal direction. FIG. 19 illustrates a state in which the first module 410 is fixed to a lateral region of the inner surface of the outer lens part 200 that is formed forward, and the second module 420 is fixed to a front end of the region of the heat sink 500 that protrudes forward.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lamp for a vehicle, the lamp comprising:
a lamp housing part configured to accommodate a light source in an internal lamp housing part space defined therein;
an outer lens part coupled to a first side of the lamp housing part and configured to cover the internal lamp housing part space; and

12 a vibration part fixed to the lamp housing part,
wherein the vibration part comprises:
a first module fixed to the first side of the lamp housing part; and
a second module configured to face the first module,
wherein the first module comprises:
a first magnet; and
a first magnet fixing portion to which the first magnet is fixed,
wherein the second module comprises:
a second magnet configured to face the first magnet;
a second magnet fixing portion configured to accommodate the second magnet; and
a coil member provided at one side of the second magnet and accommodated in the second magnet fixing portion, and
wherein the first magnet fixing portion is fixed to the lamp housing part.

2. The lamp of claim 1, wherein a through-hole is formed in the second magnet, and
wherein a rib region is provided on the second magnet fixing portion, the rib region being configured to protrude so as to be inserted into the through-hole of the second magnet.

3. The lamp of claim 1, wherein the first magnet fixing portion comprises a first module sidewall region configured to protrude from the lamp housing part and configured to define a first magnet accommodation space therein configured to accommodate the first magnet,
wherein the second magnet fixing portion comprises a second module sidewall region configured to extend toward the first magnet fixing portion,
wherein a first screw thread region is formed in the first module sidewall region,
wherein a second screw thread region is formed in the second module sidewall region, and
wherein the first screw thread region and the second screw thread region are screw-coupled to each other.

4. The lamp of claim 3, wherein the first magnet fixing portion further comprises a first protruding coupling region configured to protrude outward from an outer peripheral surface of the first module sidewall region,
wherein the second magnet fixing portion further comprises a second protruding coupling region configured to protrude toward the first magnet fixing portion from the second module sidewall region, and
wherein the first protruding coupling region is fixedly coupled to the second protruding coupling region.

5. The lamp of claim 4, wherein a recessed section having a recessed shape is formed in the second protruding coupling region, and at least a part of the first protruding coupling region is inserted into the recessed section.

6. The lamp of claim 3, wherein the first screw thread region is provided as a plurality of first screw thread regions provided along a periphery of the first module sidewall region, the plurality of first screw thread regions being spaced apart from one another,
wherein the second screw thread region is provided as a plurality of second screw thread regions provided along a periphery of the second module sidewall region, the plurality of second screw thread regions being spaced apart from one another, and
wherein the plurality of first screw thread regions and the plurality of second screw thread regions are respectively screw-coupled to one another.

7. The lamp of claim 6, wherein a smooth curved surface region is formed in a first section of the first module sidewall region between a first respective pair of adjacent first screw thread regions, and wherein a smooth curved surface region is formed in a second section of the second module sidewall region between a second respective pair of adjacent second screw thread regions.

8. The lamp of claim 1, wherein the second module further comprises a connection member, the connection member being electrically connected to the coil member, wherein an insertion hole is formed in the second magnet fixing portion, and wherein a part of the connection member is configured to pass through the insertion hole.

9. The lamp of claim 8, wherein the insertion hole is formed in a first region of the second magnet fixing portion spaced apart from the first module in a first direction in which the first magnet faces the second magnet.

10. The lamp of claim 3, wherein the second magnet fixing portion further comprises:

a first frame region configured to accommodate the second magnet and the coil member, the first frame region being configured to be opened toward the first module; and a second frame region configured to surround the first frame region and configured to fix the first frame region to the second frame region, and wherein a third section of the second frame region to which the first frame region is fixed has a shape configured to protrude toward the first module further than a peripheral section of the third section to which the first frame region is fixed.

11. The lamp of claim 10, wherein the second module sidewall region is provided in the second frame region, and wherein the first frame region is configured to protrude toward the first module further than the second module sidewall region.

12. The lamp of claim 1, further comprising:

a heat sink provided at one side of the lamp housing part, wherein a first side of the second module is supported by the heat sink.

13. A lamp for a vehicle, the lamp comprising:

a lamp housing part configured to accommodate a light source in an internal lamp housing part space defined therein;

an outer lens part coupled to a first side of the lamp housing part and configured to cover the internal lamp housing part space; and a vibration part fixed to the outer lens part, wherein the vibration part comprises:

a first module fixed to the first side of the lamp housing part; and a second module configured to face the first module, wherein the first module comprises:

a first magnet; and a first magnet fixing portion to which the first magnet is fixed, wherein the second module comprises:

a second magnet configured to face the first magnet;

a second magnet fixing portion configured to accommodate the second magnet; and a coil member provided at one side of the second magnet and accommodated in the second magnet fixing portion, and wherein the first magnet fixing portion is fixed to the outer lens part.

14. The lamp of claim 13, further comprising:

a heat sink provided at one side of the lamp housing part, wherein a first side of the second module is supported by the heat sink.

15. The lamp of claim 14, wherein one side of the first module is fixed to one of an upper and a lower region of an inner surface of the outer lens part that extends in a direction intersecting an upward/downward direction, and wherein one side of the second module is fixed to an end of a region of the heat sink that protrudes upward or downward.

16. The lamp of claim 14, wherein a first side of the first module is fixed to a first region of an inner surface of the outer lens part that extends in a direction intersecting a horizontal direction, and wherein a first side of the second module is fixed to an end of a region of the heat sink that protrudes in the horizontal direction.

17. The lamp of claim 13, wherein the first magnet fixing portion comprises a first module sidewall region configured to protrude from the outer lens part and configured to define a first magnet accommodation space therein configured to accommodate the first magnet, wherein the second magnet fixing portion comprises a second module sidewall region configured to extend toward the first magnet fixing portion, wherein a first screw thread region is formed in the first module sidewall region, wherein a second screw thread region is formed in the second module sidewall region, and wherein the first screw thread region and the second screw thread region are screw-coupled to each other.

18. The lamp of claim 17, wherein the first magnet fixing portion further comprises a first protruding coupling region configured to protrude outward from an outer peripheral surface of the first module sidewall region, wherein the second magnet fixing portion further comprises a second protruding coupling region configured to protrude toward the first magnet fixing portion from the second module sidewall region, and wherein the first protruding coupling region is fixedly coupled to the second protruding coupling region.

19. The lamp of claim 17, wherein the first screw thread region is provided as a plurality of first screw thread regions provided along a periphery of the first module sidewall region, the plurality of first screw thread regions being spaced apart from one another, wherein the second screw thread region is provided as a plurality of second screw thread regions provided along a periphery of the second module sidewall region, the plurality of second screw thread regions being spaced apart from one another, and wherein the plurality of first screw thread regions and the plurality of second screw thread regions are respectively screw-coupled to one another.

20. The lamp of claim 1, wherein the first magnet and the second magnet are arranged such same polarities of the first and second magnets face each other, whereby a repulsive force is applied between the first magnet and the second magnet, and the second module is spaced apart from the first module by the repulsive force.

* * * * *